6. COMPOSITIONS, COATING OR PLASTIC.

Patented Feb. 4, 1930

1,745,635

UNITED STATES PATENT OFFICE

GUSTAVE ADOLPH NEW, OF PORT CLINTON, OHIO, ASSIGNOR TO AMERICAN GYPSUM COMPANY, OF PORT CLINTON, OHIO, A CORPORATION OF OHIO

CELLULAR STUCCO MIX AND METHOD OF MAKING THE SAME

No Drawing. Application filed June 8, 1927. Serial No. 197,517.

This invention relates to improvements in cellular stucco, concrete or other material which sets or hardens through crystallization, and more particularly to an improved composition of which stucco (partially calcined gypsum) or plaster of Paris is the base, and suitable by reason of its light and cellular texture as a building material, and especially for sound and heat insulating purposes.

The object of the invention is to provide a satisfactory material of a cementitious character which may be used extensively in building operations for the construction of partition walls, floors, roofs and like structural formations as an insulating filler. As such, it is preferably poured or spread in its wet state in the spaces or onto the surfaces prepared to receive it, and on setting and drying forms a hard tough substance which is not only light in weight, but by reason of its cellular or porous texture affords a high degree of insulation against the transmission of heat and sound.

The material of the present invention is primarily intended to be cast by pouring, either "on the job", as just suggested, or in forms or molds to be later set or erected in place. It may also be employed in the manufacture of the several gypsum products, such as blocks, wall and plaster board and the like, although its nature is such that it is better suited for pouring or casting to thicknesses considerably greater than found in the ordinary manufactured gypsum products.

Considerable effort has heretofore been directed to the production of a satisfactory stucco or plaster of Paris filler of a light cellular texture, and various combinations of ingredients have been devised, which when mixed with the stucco, will react to liberate a gas calculated to disseminate through the mass or mix in bubbles. Such ingredients, or combination of ingredients, are intended to accomplish two essential functions. First, the generation or liberation of the gas, and second, to impart those qualities to the stucco mass which will confine and hold the gas in cells or pockets of a uniform size, equally distributed throughout the mass so that on setting it will present a homogeneous texture.

Experience has shown that it is a comparatively simple matter to mix a substance with stucco which will liberate gas in the presence of water, but it is quite another problem to control the reaction so that it does not continue after the stucco has been poured and setting commenced. The importance of controlling the action of the ingredients is manifest, since otherwise it would be quite impossible to gauge the depth of the mass or the thickness of the layer which any given quantity of the mix will occupy. It follows, therefore, that any reaction resulting in the liberation of gas should be rapid and complete so that the mix will be stable and its density fixed by the time it has been poured.

On the other hand, there are certain conditions to be guarded against in the selection of ingredients intended to impart the necessary qualities in the stucco mix for impounding or entraining the gas bubbles in the mass. Various so-called foam producing agents have been employed with substances added to increase the stability of the foam. Starch or a like carbo-hydrate, soap derivatives and other substances have been used, but these invariably possess other characteristics which exhibit a deleterious effect on the resulting product. For instance, starch has a well defined affinity for water and its presence tends to retard the hardening of the stucco and increases its tendency to absorb moisture. For this reason, also, the problem of storage and transportation of the dry product, either mixed with stucco or separate, is complicated by the fact that it must be rendered proof against atmospheric and weather conditions, otherwise it will deteriorate before use.

The present invention, therefore, contemplates a mixture or composition of stucco or plaster with certain ingredients added which will not only produce a hard, tough and light material of cellular texture, but one which can be readily controlled in its action, is uniform in quality, relatively moisture repellant in its properties, both in the finished product and in dry form, and lastly, possessing all of the qualities required in an insulating, filling, covering or reinforcing material of a cementitious character.

As already stated, the preferred base of the mix is stucco, (partially calcined gypsum) or plaster of Paris—either being satisfactory. Taking a quantity of stucco in an amount represented as 100 parts of the final mix in dry form, the following are the ingredients and amounts in which they are added to the stucco or compounded separately for mixing with the stucco and water:

| | Parts |
|---|---|
| Sodium bisulphate ($NaHSO_4$) | 2.5 to 7 |
| Potassium carbonate ($K_2CO_3$) | 1.1 to 4½ |
| Blood albumin (dried blood) approximately | .18 |
| Burned or hydrated lime | .1 |

Of the foregoing ingredients the sodium bisulphate and potassium carbonate are variable quantities, depending on the texture of the mix desired, that is to say, the greater the amount of these ingredients added, the lighter and less dense will be the resulting mix. Similarly, by reducing the amounts added the more dense and therefore heavier will be the mix. For example, I find that if stucco, sodium bisulphate and potassium carbonate are present in the mix in the proportions of 100 parts to 7 parts to 4½ parts respectively, the dried product will weigh approximately 18 pounds per cubic foot.

I choose sodium bisulphate and potassium carbonate for the reason that they are relatively inexpensive substances, and react with the desired rapidity to produce the results which will now be explained.

When these ingredients are mixed with stucco and water, carbon dioxide gas is liberated from the potassium carbonate, assisted by the sodium bisulphate. The gas thus liberated disseminates through the mix in the form of bubbles—the larger the amounts of the ingredients present the larger will be the volume of gas produced and hence the size of the bubbles. The bubbles distribute themselves uniformly through the mass, being surrounded by thin partition walls of stucco, although the formation and distribution of the bubbles is largely dependent upon the presence of the other ingredients, as will presently be explained.

By virtue of the properties of rapid reaction possessed by the sodium bisulphate and potassium carbonate, the physical change in the stucco is complete within a relative short space of time after the mixture takes place, with the result that on pouring the mix into any space to be filled thereby, the same has since reached a condition of stability which precludes the possibility of further swelling or expansion, such as is frequently encountered in the use of other preparations, due to the tardy or prolonged reaction of the gas generating ingredients. The sodium bisulphate and potassium carbonate may be either in granular or powdered form, depending largely on the size of the cells to be formed and therefore on the texture of the mix desired.

Referring now to the purpose and function of the remaining ingredients it may be said generally that they provide the agent which entrains and entraps the gas and gives strength and stability to the mix prior to reaching the stage of setting, so that the bubbles or cells will be preserved. In other words, they impart those qualities to the mix which gives it the capacity to partake of the cellular texture and to maintain such texture uniformly throughout the mass during the mixing and pouring operations and the period required for the setting and hardening.

The use of the two primary ingredients of the entraining agent, namely, blood albumin and lime, has been described in the process disclosed in my prior application, Serial No. 192,793 filed May 19, 1927, and their function in the present process is somewhat similar to that in the previous process.

Considered separately from the other ingredients of the present composition, I have discovered that dried blood, which is the source of blood albumin, when dissolved in water will produce a solution capable of being whipped or beaten into a froth or foam —the albumin present being the foaming agent. The foam thus formed, however, is not of a stable character, is non-uniform in texture and the quantity of the foam produced is relatively small. The addition of burned or hydrated lime in the proportion of approximately 1 part to 2 parts of dried blood produces a solution having marked foam producing properties, in that the amount of foam is voluminous, its texture is uniform, and its stability is exceptional, so much so that the foam will retain substantially its original bulk and texture after the moisture has evaporated, leaving a dry sponge-like residue. The unusul qualities of a foam produced by a solution of blood albumin and lime, I attribute to the conversion of the albumin wholly or in part into glue or a substance having the adhesive properties of glue.

The blood albumin and lime react in the manner just described when introduced into a mixture of sodium bisulphate and potassium carbonate, stucco and water, namely, to create a highly stable foam of a tough elasticity which confines the bubbles to a more or less uniform size distributed with a high degree of uniformity throughout the mass. Moreover, I find that the presence of the blood albumin and lime provides a successful preventative against efflorescence, that is the formation of certain salts which ordinarily come to the surface of the cast and are deposited in clusters after the evaporation of the water.

I have also found that a slight excess of burned lime over and above that actually required to react with the albumin is beneficial, since its serves to promote the setting of the stucco and serves as an agent for absorbing any moisture to which the mixture may be exposed during storage or transportation, either separate or as a part of a dry stucco mix prepared for use by mixing with water.

As just suggested, the cell forming ingredients may be compounded as a mixture to be added to stucco or to any other form of cementitious material, as for instance, the ordinary stucco and sand mixture when the production of a cellular stucco cement is sought. Fibrous material, such as wood shavings, may also be added if desired, to increase the strength of the material without increasing its weight.

However, I do not wish to be limited to the particular form in which the composition is used or marketed, nor to the specific proportions in which the same are compounded.

I claim as my invention:

1. A cellular stucco mix, consisting of calcined gypsum as the basic ingredient, to which is added sodium bisulphate, potassium carbonate, blood albumin and lime and the whole reduced to a plastic state by mixing with water.

2. A cellular stucco mix, consisting of calcined gypsum as the basic ingredient, a gas producing ingredient and a gas entraining agent consisting of blood albumin and lime, the whole being reduced to a plastic mass of cellular texture by mixture with water.

3. A cellular stucco mix, consisting of calcined gypsum in the proportion of substantially one hundred (100) parts, to which is added substantially seven (7) parts of sodium bisulphate, four and one-half (4½) parts of potassium carbonate, two-tenths (.2) parts of dried blood one one-tenth (.1) part of burned lime.

4. A cellular stucco mix consisting of calcined gypsum in the proportion of substantially one hundred (100) parts, from seven (7) to three (3) parts of sodium bisulphate, from four and one-half (4½) to one (1) part of potassium carbonate, and three-tenths (.3) parts of a mixture of dried blood and burned lime.

5. A composition of matter for the purpose described, comprising a mixture of calcined gypsum, a salt having an acid reaction in the presence of water, a carbonate, blood albumin and lime.

6. A composition of matter for the purpose described, comprising a mixture of calcined gypsum, sodium bisulphate, a water soluble carbonate, blood albumin and lime.

7. A composition of matter for the purpose described, comprising a mixture of calcined gypsum, sodium bisulphate, potassium carbonate, blood albumin and hydrated lime.

8. A composition of matter for the purpose described, comprising a mixture in the proportion of substantially one hundred (100) parts of calcined gypsum, two (2) to seven (7) parts of sodium bisulphate, four (4) parts of potassium carbonate, and three-tenths (.3) part of a mixture of blood and lime in the proportion of two (2) parts to one (1) part, respectively.

9. A composition of matter for the purpose described, comprising a mixture of substantially one hundred (100) parts of calcined gypsum, from seven (7) to two and one-half (2½) parts of sodium bisulphate, from four and one-half (4½) to one (1) part of potassium carbonate, and less than one (1) part of a mixture of blood albumin and lime.

Signed at Port Clinton, Ohio, this 3rd day of June, 1927.

GUSTAVE ADOLPH NEW.